(12) United States Patent
Zhang et al.

(10) Patent No.: US 11,967,990 B2
(45) Date of Patent: Apr. 23, 2024

(54) MANY-TO-MANY LASER COMMUNICATION NETWORKING DEVICE AND METHOD

(71) Applicants: PENG CHENG LABORATORY, Shenzhen (CN); HARBIN INSTITUTE OF TECHNOLOGY (SHENZHEN), Shenzhen (CN)

(72) Inventors: Qinyu Zhang, Shenzhen (CN); Jiayin Xue, Shenzhen (CN); Yiqun Zhang, Shenzhen (CN); Linkai Wen, Shenzhen (CN); Zhenyang Qian, Shenzhen (CN)

(73) Assignees: PENG CHENG LABORATORY, Shenzhen (CN); HARBIN INSTITUTE OF TECHNOLOGY (SHENZHEN), Shenzhen (CN)

( * ) Notice: Subject to any disclaimer, the term of this patent is extended or adjusted under 35 U.S.C. 154(b) by 0 days.

(21) Appl. No.: 18/342,115

(22) Filed: Jun. 27, 2023

(65) Prior Publication Data

US 2023/0353242 A1 Nov. 2, 2023

Related U.S. Application Data

(63) Continuation of application No. PCT/CN2022/127807, filed on Oct. 27, 2022.

(30) Foreign Application Priority Data

Mar. 10, 2022 (CN) .......................... 202210229204.7

(51) Int. Cl.
*H04B 10/118* (2013.01)
*H04B 10/50* (2013.01)

(52) U.S. Cl.
CPC ......... *H04B 10/118* (2013.01); *H04B 10/503* (2013.01)

(58) Field of Classification Search
CPC ........................... H04B 10/118; H04B 10/503
(Continued)

(56) References Cited

U.S. PATENT DOCUMENTS

| 6,348,986 | B1 * | 2/2002 | Doucet | H01B 11/22 |
| | | | | 398/128 |
| 11,677,469 | B1 * | 6/2023 | Matsumori | G01S 19/485 |
| | | | | 398/121 |

(Continued)

FOREIGN PATENT DOCUMENTS

| AU | 2020103610 A4 | 2/2021 |
| CN | 103744087 A | 4/2014 |

(Continued)

OTHER PUBLICATIONS

First Office Action issued in counterpart Chinese Patent Application No. 202210229204.7, dated May 24, 2022.

(Continued)

*Primary Examiner* — Abbas H Alagheband
(74) *Attorney, Agent, or Firm* — Westbridge IP LLC

(57) ABSTRACT

Disclosed are a many-to-many laser communication networking device and a method. The device includes: an optical field array control module, a transceiver lens array module, an array phase detection module, an array characteristic splitting module, a beam switching array module and a signal transmission module. The optical field array control module is configured to receive a plurality of beams of laser light with different angles, and adjust the corresponding angle of the laser. The transceiver lens array module is configured to convert the angle-adjusted laser into beams of second optical fiber light. The array characteristic splitting module is configured to analyze the second optical fiber light to obtain the second characteristic information. The beam switching array module is configured to control the second optical fiber light to be demodulated into baseband signals (Continued)

via a first path or to be forwarded via a second path according to the second characteristic information.

15 Claims, 8 Drawing Sheets

(58) Field of Classification Search
USPC .......................................................... 398/122
See application file for complete search history.

(56) References Cited

U.S. PATENT DOCUMENTS

| | | | |
|---|---|---|---|
| 2002/0075543 A1* | 6/2002 | Doucet | H01B 11/22 398/121 |
| 2002/0085594 A1* | 7/2002 | Pezeshki | G02B 26/0816 372/20 |
| 2013/0230065 A1* | 9/2013 | Honea | G02B 6/32 372/20 |
| 2015/0244458 A1* | 8/2015 | Erkmen | H04B 7/18504 398/122 |
| 2017/0346563 A1 | 11/2017 | Steinkraus et al. | |
| 2018/0088280 A1* | 3/2018 | Kim | H04B 10/1129 |
| 2019/0081697 A1* | 3/2019 | Wyler | H04B 7/2041 |
| 2019/0123813 A1* | 4/2019 | Mendelsohn | H04B 7/18515 |
| 2021/0013966 A1* | 1/2021 | Haraguchi | H04B 10/1127 |
| 2021/0314066 A1 | 10/2021 | Searcy et al. | |
| 2022/0385363 A1* | 12/2022 | Gette | H04B 10/5161 |

FOREIGN PATENT DOCUMENTS

| | | |
|---|---|---|
| CN | 106533562 A | 3/2017 |
| CN | 107809300 A | 3/2018 |
| CN | 108873554 A | 11/2018 |
| CN | 109660888 A | 4/2019 |
| CN | 114499665 A | 5/2022 |
| CN | 114745058 A | 7/2022 |
| EP | 3457592 A1 * | 3/2019 |

OTHER PUBLICATIONS

Gong et al., Servo System Design of Cycle-scan Tracking and Aiming Turntable for Laser Communication, Journal of Changchun University of Science and Technology (Natural Science Edition), vol. 42, No. 6, dated Feb. 28, 2019.

International Search Report and Written Opinion issued in corresponding PCT Application No. PCT/CN2022/127807, dated Jan. 19, 2023.

Jiang et al., Research of Optical and APT Technology in One-Point to Multi-Point Simultaneous Space Laser Communication System, Chinese Journal of Lasers, vol. 42, No. 4, dated Apr. 10, 2015.

Notification to Grant Patent Right for Invention issued in counterpart Chinese Patent Application No. 202210229204.7, dated Jun. 15, 2022.

* cited by examiner

MANY-TO-MANY LASER COMMUNICATION NETWORKING DEVICE AND METHOD

CROSS-REFERENCE TO RELATED APPLICATIONS

This application is a continuation application of International Application No. PCT/CN2022/127807, filed on Oct. 27, 2022, which claims priority to Chinese Patent Application No. 202210229204.7, filed on Mar. 10, 2022. The disclosures of the above-mentioned applications are incorporated herein by reference in their entireties.

TECHNICAL FIELD

The present application relates to the technical field of space laser communication, in particular to a many-to-many laser communication networking device and a many-to-many laser communication networking method.

BACKGROUND

Due to its extremely small beam width and extremely high carrier frequency, space laser communication possesses advantages of high speed, high gain, anti-interference, and good directivity. In recent years, it has received extensive attention and rapid development in the field of inter-satellite link technology. The application of Optical Inter-Satellite Link (OISL) has shown a rapid upward trend. The United States, Europe, Japan, Russia, and China have successively completed laser communication space experiments. Typical lower earth orbit (LEO) constellations in orbit and under development, such as Starlink in the United States, One Web in the United Kingdom, and Xingyun 2 in China, all have inter-satellite point-to-point laser communication capabilities. On the other hand, the extremely small beam width and excellent directivity also limit the field of view coverage and simultaneous multi-communication capabilities of the laser communication system, making it difficult to support the multi-directional link building of large-scale inter-satellite network, simultaneous transceiving, flexible deployment and other requirements in the future.

Large-scale inter-satellite network requires satellites to establish and maintain multiple inter-satellite laser communication links, that is, to realize multipoint-to-multipoint (referred to as many-to-many) network communication of laser communication terminal (LCT). A key requirement in the 2021 request for proposal (RFP) for the U.S. Department of Defense's Space Development Agency (SDA) is to support OISL to simultaneously establish and maintain at least three optical links, with a goal of five or more links.

For the exploration of laser communication systems that can support multi-link networking, one type of technical solution in the research field is one-to-many stacking expansion technology: this technical solution needs to provide multiple point-to-point LCTs on a single satellite platform to realize multiple communication links construction. However, this will greatly increase the size, weight, power and cost (SWPaC) of the payload, and cannot achieve effective collaboration between multiple terminals. Another type of technical solution is antenna integration or splicing technologies such as optical phased arrays, such as bionic compound eyes, MEMS array optical antennas, etc. However, limited by existing devices and process levels, the networking terminal system project based on optical antenna integration/splicing is difficult to realize at present, and the technology maturity is low.

Therefore, further improvements and enhancements are required in the related art.

SUMMARY

The main purpose of the present application is to provide a many-to-many laser communication networking device and a many-to-many laser communication networking method, aiming at solving the problem of simultaneous sending and receiving, flexible networking and high power-consumption when laser communication is carried out between large-scale satellites in the related art.

In order to achieve the above purpose, the present application adopts the following technical solutions.

The present application provides a many-to-many laser communication networking device, including: an optical field array control module; a transceiver lens array module; an array phase detection module; an array characteristic splitting module; a beam switching array module; and a signal transmission module.

The transceiver lens array module, the array characteristic splitting module and the beam switching array module are sequentially connected, the signal transmission module is connected to the optical field array control module, the transceiver lens array module, the array characteristic splitting module and the beam switching array module respectively, and the transceiver lens array module is further connected to the array phase detection module.

The optical field array control module is configured to receive a plurality of beams of a laser with different angles sent by a plurality of satellites, adjust corresponding angles of the laser, and transmit an angle-adjusted laser to the transceiver lens array module.

The transceiver lens array module is configured to convert the angle-adjusted laser into a plurality of beams of a first optical fiber light and a plurality of beams of a second optical fiber light, transmit the plurality of beams of the first optical fiber light to the array phase detection module, and transmit the plurality of beams of the second optical fiber light to the array characteristic splitting module.

The array phase detection module is configured to generate a plurality of different first characteristic information correspondingly according to the plurality of beams of the first optical fiber light, and transmit the first characteristic information to the signal transmission module.

The array characteristic splitting module is configured to generate a plurality of different second characteristic information correspondingly after analyzing the plurality of beams of the second optical fiber light, and transmit the second characteristic information to the signal transmission module.

The signal transmission module is configured to transmit the first characteristic information to the optical field array control module and the transceiver lens array module, and transmit the second characteristic information to the beam switching array module.

The beam switching array module is configured to control the plurality of beams of the second optical fiber light to be demodulated into baseband signals via a first path or to be forwarded via a second path according to the second characteristic information.

In an embodiment, the transceiver lens array module includes a coupling lens unit, a divergence angle control unit, and an optical fiber light control unit.

The divergence angle control unit is connected to the coupling lens unit and the divergence angle control unit respectively, the divergence angle control unit is further connected to the signal transmission module, the optical fiber light control unit is further connected to the array phase detection module and the array characteristic splitting module.

The coupling lens unit is configured to couple the angle-adjusted laser into the plurality of beams of the optical fiber light, and transmit the plurality of beams of the optical fiber light to the divergence angle control unit.

The divergence angle control unit is configured to adjust divergence angles of the plurality of beams of the optical fiber light according to the first characteristic information, and is configured to transmit the plurality of beams of optical fiber light to the optical fiber light control unit.

The optical fiber light control unit is configured to divide the plurality of beams of optical fiber light into the plurality of beams of the first optical fiber light and the plurality of beams of the second optical fiber light, transmit the plurality of beams of the first optical fiber light to the array phase detection module, and transmit the plurality of beams of the second optical fiber light to the array characteristic splitting module.

In an embodiment, the optical field array control module includes N mirror groups, N array displacement actuators, and a high-precision controller; and each of the array displacement actuators is connected to each of the mirror groups one by one, each of the array displacement actuators is further connected to the high-precision controller, and the high-precision controller is further connected to the signal transmission module.

In an embodiment, the array phase detection module includes an array detector, and a phase processor; and the array detector is connected to the optical fiber light control unit and the phase processor respectively, and the phase processor is further connected to the signal transmission module.

In an embodiment, the array characteristic splitting module includes N polarization wavelength detectors, N polarization wavelength splitters, and a splitting controller; and each of the polarization wavelength detectors is connected to the optical fiber control unit and each of the polarization wavelength splitters respectively, each of the polarization wavelength splitters is further connected to the splitting controller and the beam switching array module respectively, and the splitting controller is further connected to the signal transmission module.

In an embodiment, the beam switching array module includes N optical switches, N communication transceiver boards, N first optical fiber controllers, N second optical fiber controllers, and a communication controller; and each of the optical switches is connected to each of the polarization wavelength splitters and each of the first optical fiber controllers respectively, each of the optical switches is further connected to the communication controller, each of the first optical fiber controllers is further connected to each of the second optical fiber controllers and each of the communication transceiver boards, and each of the second optical fiber controllers is further connected to the optical fiber light control unit.

In an embodiment, the signal transmission module includes a high-speed bus connected to the optical field array control module, the divergence angle control unit, the array phase detection module, the splitting controller and the communication controller respectively.

In an embodiment, the coupling lens unit includes N coupling lens groups, and each of the coupling lens groups is connected to the divergence angle control unit.

In an embodiment, the divergence angle control unit includes N divergence angle adjusters and N divergence angle controllers; and each of the divergence angle adjusters is connected to each of the coupling lens groups respectively, and each of the divergence angle controllers is connected to the optical fiber light control unit.

In an embodiment, the optical fiber control unit includes N optical fibers, N third optical fiber controllers, and N optical circulators; and each of the optical fiber controllers is connected to each of the optical fibers respectively, each of the optical circulators is connected to the transceiver lens array module, and each of the optical circulators is further connected to the array characteristic splitting module.

In an embodiment, the optical field array control module is further configured to adjust an incident angle between itself and the laser according to the first characteristic information; and the transceiver lens array module is further configured to adjust the angle-adjusted divergence angle of the laser according to the first characteristic information.

A many-to-many laser communication networking method based on the many-to-many laser communication networking device, including:

receiving, by the optical field array control module, the plurality of beams of the laser with different angles sent by the plurality of satellites, and adjusting the corresponding angles of the laser before transmitting the angle-adjusted laser to the transceiver lens array module;

converting, by the transceiver lens array module, the angle-adjusted laser into the plurality of beams of the first optical fiber light and the plurality of beams of the second optical fiber light, transmitting the plurality of beams of the first optical fiber light to the array phase detection module, and transmitting the plurality of beams of the second optical fiber light to the array characteristic splitting module;

generating, by the array phase detection module, the plurality of different first characteristic information correspondingly according to the plurality of beams of the first optical fiber light, and transmitting the first characteristic information to the signal transmission module; the first characteristic information is a relative angle information;

generating, by the array characteristic splitting module, the corresponding second characteristic information after analyzing the plurality of beams of the second optical fiber light, and transmitting the second characteristic information to the signal transmission module, the second characteristic information is a polarization wavelength information;

transmitting, by the signal transmission module, the first characteristic information to the optical field array control module and the transceiver lens array module, and transmitting the polarization wavelength information to the beam switching array module;

adjusting, by the optical field array control module, the incident angle between itself and the laser according to the first characteristic information, and adjusting, by the transceiver lens array module, the angle-adjusted divergence angle of the laser according to the first characteristic information; and controlling, by the beam switching array module, the plurality of beams of the second optical fiber light to be demodulated into the baseband signals via the first path or to be forwarded via the second path according to the polarization wavelength information.

In an embodiment, the converting, by the transceiver lens array module, the angle-adjusted laser into the plurality of beams of the first optical fiber light and the plurality of beams of the second optical fiber light, transmitting the plurality of beams of the first optical fiber light to the array phase detection module, and transmitting the plurality of beams of the second optical fiber light to the array characteristic splitting module specifically includes:

after receiving the angle-adjusted laser transmitted by the mirror group, performing, by the coupling lens group, performing coupling to obtain the plurality of beams of the optical fiber light, and transmitting the plurality of beams of the optical fiber light to a third optical fiber controller;

after dividing the plurality of beams of the optical fiber into the plurality of beams of the first optical fiber light and the plurality of beams of the second optical fiber light, transmitting, by the third optical fiber controller, the plurality of beams of the first optical fiber to the array detector, and transmitting the plurality of beams of the second optical fiber light to an optical circulator; and transmitting, by the optical circulator, the plurality of beams of the second optical fiber light to the polarization wavelength detector.

In an embodiment, the adjusting, by the optical field array control module, the incident angle between itself and the laser according to the first characteristic information, and adjusting, by the transceiver lens array module, the angle-adjusted divergence angle of the laser according to the first characteristic information includes:

after receiving the relative angle information transmitted by the high-speed bus, adjusting, by the high-precision controller, the angle of the mirror group according to the relative angle information;

after receiving the relative angle information transmitted by the high-speed bus, controlling, by the divergence angle controller, the divergence angle adjuster to adjust the angle-adjusted divergence angle of the laser according to the relative angle information.

In an embodiment, the controlling, by the beam switching array module, the plurality of beams of the second optical fiber light to be demodulated into the baseband signals via the first path or to be forwarded via the second path according to the polarization wavelength information includes:

after receiving the polarization wavelength characteristic information transmitted by the high-speed bus, comparing, by the communication controller, the polarization wavelength characteristic information with a preset polarization wavelength characteristic information;

in response to that the polarization wavelength characteristic information is the same as the preset polarization wavelength characteristic information, controlling, by the communication controller, the optical switch to transmit the second optical fiber light to the communication transceiver board through the first optical fiber controller;

demodulating, by the communication transceiver board, the second optical fiber light, after obtaining the baseband signal, sending the baseband signal;

in response to that the polarization wavelength characteristic information is different from the preset polarization wavelength characteristic information, after controlling, by the communication controller, the optical switch to transmit the second optical fiber light to the second optical fiber controller through the first optical fiber controller, transmitting, by the second optical fiber controller, the second optical fiber light to the optical circulator;

after transmitting, by the optical circulator, the second optical fiber to the third optical fiber controller, transmitting, by the third optical fiber controller, the second optical fiber light to a corresponding array element, so that the array element will forward the second optical fiber light, the array element includes the mirror group, the array displacement actuator, the coupling lens group and the divergence angle adjuster.

Compared with the related art, the present application provides a many-to-many laser communication networking device and a many-to-many laser communication networking method. The device includes: an optical field array control module, a transceiver lens array module, an array phase detection module, an array characteristic beam splitting module, a beam switching array module and a signal transmission module. The optical field array control module is configured to receive a plurality of beams with different angles, and adjust the corresponding angle of the laser. The transceiver lens array module is configured to convert the angle-adjusted laser beams into a plurality of beams of the second optical fiber. The array characteristic splitting module is configured to analyze the second optical fiber to obtain the second characteristic information. The beam switching array module is configured to control the demodulation of the second optical fiber through the first path to a baseband signal or according to the second characteristic information forwarding via the second path. The beam switching array module controls the plurality of beams of the second optical fiber light according to the second characteristic information, and demodulates them into baseband signals via the first path or forwards them via the second path, so as to achieve flexible sending and receiving of the plurality of beams of the laser light simultaneously and reduce power-consumption.

DETAILED DESCRIPTION OF THE EMBODIMENTS

Figure 1:
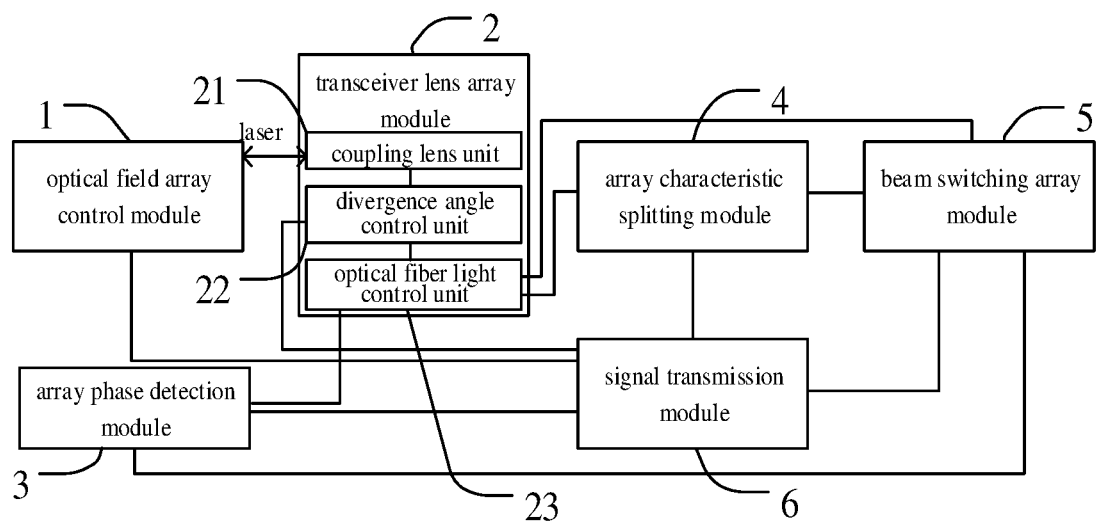
FIG. 1 is a schematic structural diagram of a many-to-many laser communication networking device of the present application.

In order to make the purpose, technical solution and effect of the present application clearer and more definite, the present application will be further described in detail below with reference to the accompanying drawings and embodiments. It should be understood that the specific embodiments described here are only used to explain and not to limit the present application.

Those skilled in the art can understand that, unless otherwise stated, the singular forms "a", "an", and "the" used herein may also include plural forms. It should be further understood that the word "including" used in the description of the present application refers to the presence of the features, integers, steps, operations, elements and/or components, but does not exclude the presence or addition of one or more other features, integers, steps, operations, elements, components, and/or groups thereof. It should be understood that when an element is referred to as being "connected" or "coupled" to another element, it can be directly connected or coupled to the other element or be connected through an intervening element. Additionally, "connected" or "coupled" as used herein may include wireless connection or wireless coupling. The expression "and/or" used herein includes all or any elements and all combinations of one or more associated listed items.

Those skilled in the art can understand that, unless otherwise defined, all terms (including technical terms and scientific terms) used herein have the same meaning as commonly understood by those of ordinary skill in the art to which this application belongs. It should also be understood that terms, such as those defined in commonly used dictionaries, should be understood to have meanings consistent with their meaning in the context of the prior art, and unless specifically defined as herein, are not intended to be idealized or overly formal meaning to explain.

The present application provides a many-to-many laser communication networking device and a many-to-many laser communication networking method. In the present application, the plurality of beams of the laser with different angles sent by the plurality of the satellites are correspondingly angle-adjusted through the optical field array control module firstly, the transceiver lens array module converts the angle-adjusted laser into the plurality of beams of the first optical fiber light and the plurality of beams of the second optical fiber light, and then, the array phase detection module generates a first characteristic information according to the plurality of beams of the first optical fiber light. At the same time, the array characteristic splitting module generates a second characteristic information after analyzing the plurality of beams of the second optical fiber light, and then, the beam switching array module is configured to control the plurality of beams of the second optical fiber light to be demodulated into a baseband signal via the first path or to be forwarded via the second path according to the second characteristic information, and the optical field array control module and the transceiver lens array module adjust the incident angle between themselves and the laser respectively according to the first characteristic information, and adjust the divergence angle of the angle-adjusted laser, so as to realize the flexible and coordinated sending and receiving of the plurality of beams of the laser, and there is no need to perform electrical demodulation for all the lasers, thereby reducing the system power-consumption and system complexity effectively.

The many-to-many laser communication networking device and the many-to-many laser communication networking method are described below through specific exemplary embodiments. It should be noted that the following embodiments are only used to explain the technical solutions of the present application, and are not specifically limited:

As shown in FIG. 1, the many-to-many laser communication networking device provided by the present application includes: an optical field array control module 1, a transceiver lens array module 2, an array phase detection module 3, an array characteristic splitting module 4, a beam switching array module 5, and a signal transmission module 6.

The transceiver lens array module 2, the array characteristic splitting module 4 and the beam switching array module 5 are sequentially connected, the signal transmission module 6 is further connected to the optical field array control module 1 and the transceiver lens array module 2, the array characteristic splitting module 4 and the beam switching array module 5 respectively, and the transceiver lens array module 2 is further connected to the array phase detection module 3.

The optical field array control module 1 is configured to adjust the corresponding angles of the laser 8 after receiving the plurality of beams of the laser 8 with different angles sent by plurality of satellites, and transmit the angle-adjusted laser 8 to the transceiver lens array module 2. The transceiver lens array module 2 is configured to convert the angle-adjusted laser 8 into the plurality of beams of the first optical fiber light and the plurality of beams of the second optical fiber light, transmit the plurality of beams of the first optical fiber light to the array phase detection module 3, and transmit the plurality of beams of the second optical fiber light to the array characteristic splitting module 4. The array phase detection module 3 is configured to generate the plurality of different first characteristic information correspondingly according to the plurality of beams of the first optical fiber light, and transmit the first characteristic information to the signal transmission module 6. The array characteristic splitting module 4 is configured to generate the plurality of different second characteristic information correspondingly after analyzing the plurality of beams of the second optical fiber light, and transmit the second characteristic information to the signal transmission module 6. The signal transmission module 6 is configured to transmit the first characteristic information to the optical field array control module 1 and the transceiver lens array module 2, and transmit the second characteristic information to the beam switching array module 5. The beam switching array module 5 is configured to control the plurality of beams of the second optical fiber light to be demodulated into baseband signals 9 via the first path or to be forwarded via the second path according to the second characteristic information. Both the first characteristic information and the second characteristic information belong to electrical signals, and the many-to-many laser communication networking device may be an antenna. The baseband signal 9 is coded communication information composed of "0" and "1".

Furthermore, the optical field array control module 1 is further configured to adjust the incident angle between itself and the laser 8 according to the first characteristic information; the transceiver lens array module 2 is further configured to adjust the divergence angle of the angle-adjusted laser 8.

Specifically, after the satellite group is sent into the sky, a constellation is formed, and the constellation will dynamically set tags on the satellites according to the polarization and wavelength characteristics of the light, and form a dynamic routing table (the dynamic routing table is a routing table for communication).

When one satellite is communicated with the plurality of satellites, for example, when the plurality of satellites A, B . . . N receive the task of communicating with Z satellite 10-1 at the same time, the plurality of satellites A, B . . . N will send communication beams (the laser 8) in the direction of the Z satellite 10-1 according to a rough position information on an ephemeris (the ephemeris is the satellite position at each moment predicted by the satellite tracking telemetry and command (TT&C)). The initial state of the Z satellite 10-1 networking system (the many-to-many laser communication networking device in the present application) is a broadcast mode. In this state, first, after the array phase detection module 3 receives weak optical signals (the weak optical signals are the plurality of beams of the laser 8 with different angles) from the plurality of satellites A, B . . . N, adjust the corresponding angles to the plurality of beams of the laser 8 with different angles to obtain the angle-adjusted laser 8, and transmit the angle-adjusted laser 8 to the transceiver lens array module 2, and the transceiver lens array module 2 couples the laser 8 and divides it to obtain the plurality of beams of the first optical fiber light and the plurality of beams of the second optical fiber light, transmit the plurality of beams of the first optical fiber light to the array phase detection module 3, and transmit the plurality of beams of the second optical fiber to the array characteristic splitting module 4.

Then, the array phase detection module 3 will respectively calculate the relative angles between the A, B . . . N satellites and the Z satellite 10-1 according to the plurality of beams of the first optical fiber light, and correspondingly obtain a plurality of different first characteristic information, that is, a plurality of different relative angle information, and transmit the first characteristic information to the optical field array control module 1 and the transceiver lens array module 2 through the signal transmission module 6, so that the optical field array control module 1 adjusts the incident angle between itself and the laser 8 according to the first characteristic information, and at the same time, the transceiver lens array module 2 adjusts the angle-adjusted divergence angle of the laser 8 according to the first characteristic information. Then, the array characteristic splitting module 4 analyzes the polarization and wavelength characteristics of the plurality of beams of the second optical fiber light and correspondingly generates a plurality of different second characteristic information, that is, generate a plurality of different polarization wavelength characteristic information, and transmit the second characteristic information to the beam switching array module 5 through the signal transmission module 6.

Finally, the beam switching array module 5 compares the second characteristic information with the polarization and wavelength characteristic information of the Z satellite 10-1 according to the polarization and wavelength characteristics of the Z satellite 10-1 in the dynamic routing table, that is, compare with the preset polarization wavelength characteristic information, if the second characteristic information is the same as the preset polarization wavelength characteristic information, the beam switching array module 5 controls the plurality of beams of the second optical fiber light to be demodulated into a baseband signal 9 via the first path and send the base band signal 9 out. If the second characteristic information is different from the preset polarization wavelength characteristic information, the beam switching array module 5 controls the plurality of beams of the second optical fiber light to pass through the transceiver lens array module 2 and the optical field array control module 1 sequentially via the second path and forward the plurality of beams of the second optical fiber light. According to the principle of reversible optical path, the Z Satellite 10-1 networking system emits communication beams in the same way, thus forming a two-way full-duplex networking communication system.

In the present application, the optical field array control module 1 first receives the plurality of beams of the laser 8 with different angles sent by the plurality of satellites, and then adjusts the corresponding angle of the laser 8, and then, the transceiver lens array module 2 convert the angle-adjusted laser 8 into the plurality of beams of the first optical fiber light and the plurality of beams of the second optical fiber light. The array phase detection module 3 and the beam switching array module 5 calculate and analyze the plurality of beams of the first optical fiber light and the plurality of beams of the second optical fiber light respectively to obtain the plurality of relative angle information and the plurality of polarization wavelength characteristic information accordingly. The optical field array control module 1 adjusts the incident angle between itself and the laser 8 according to the relative angle information, at the same time, the transceiver lens array module 2 adjusts the angle-adjusted divergence angle of the laser 8 according to the relative angle information, so as to realize simultaneous receiving and sending of the plurality of the satellite communication signals. The beam switching array module 5 will compare the polarization wavelength characteristic information with the preset polarization wavelength characteristic information, and then demodulate or forward the plurality of beams of the different second optical fiber lights correspondingly via different paths, so that there is no need for photoelectric-demodulating all beam information, which greatly reduces the power-consumption and complexity of the system, and expands a proportion of an optical domain in the laser 8 communication system.

Figure 2:
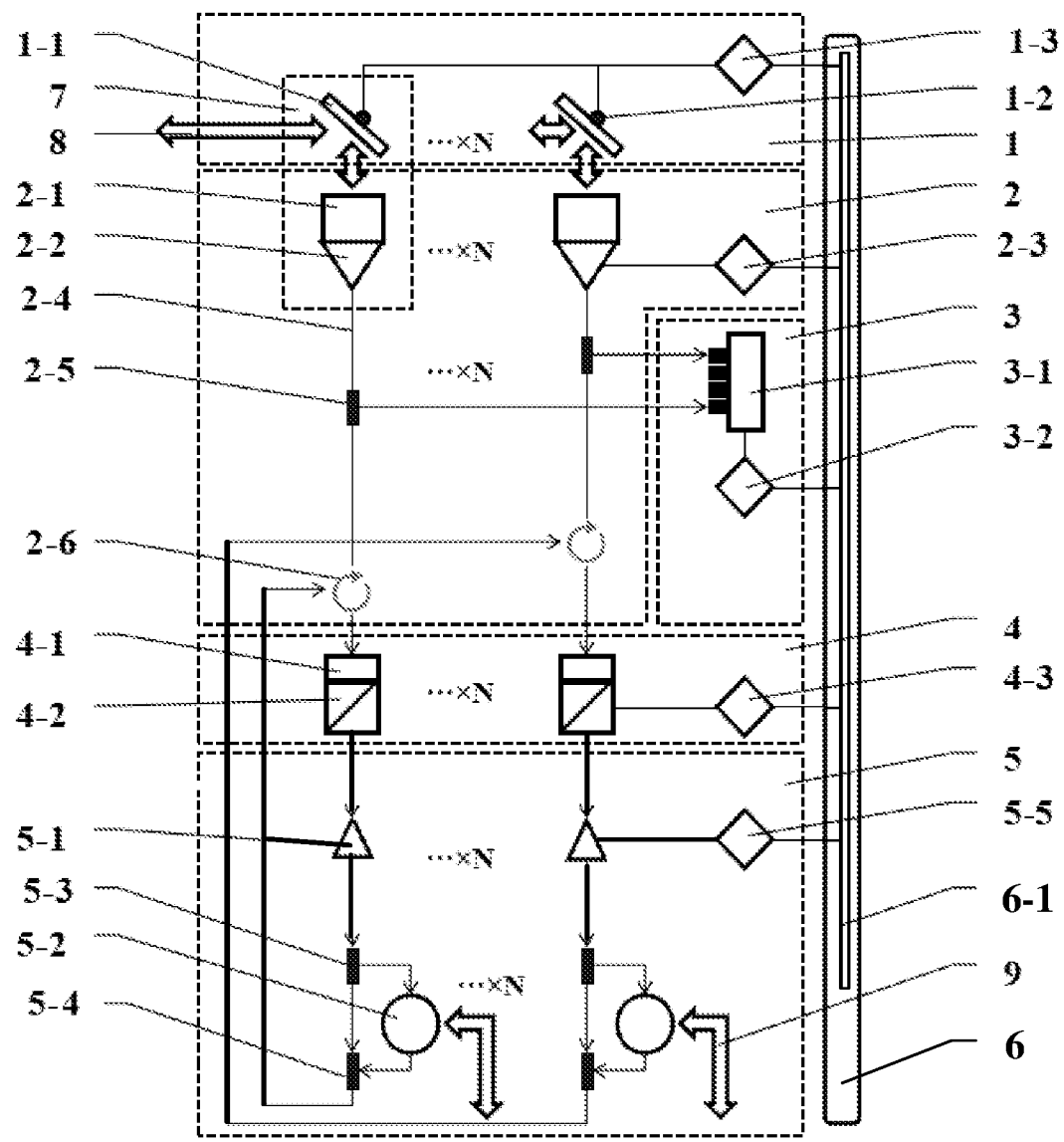
FIG. 2 is a schematic structural view of the many-to-many laser communication networking device of the present application.

Further, as shown in FIG. 2, the optical field array control module 1 includes: N mirror groups 1-1, N array displacement actuators 1-2 and a high-precision controller 1-3; each of the array displacement actuators 1-2 is connected to each of the mirror groups 1-1 one by one, each of the array displacement actuators 1-2 is further connected to the high-precision controller 1-3, and the high-precision controller 1-3 is further connected to the signal transmission module 6.

Specifically, after receiving the plurality of beams of the laser 8 with different angles from different satellites, the N mirror groups 1-1 reflect the plurality of beams of the laser 8 with different angles to obtain the plurality of angle-adjusted laser 8, reflect and send the plurality of angle-adjusted laser 8 to the transceiver lens array module 2 for the next operation. Each of the mirror groups 1-1 is provided with the array displacement actuator 1-2, and the high-precision controller 1-3 controls each of the mirror groups 1-2 according to the first characteristic information accordingly, and then the array displacement actuator 1-2 adjusts the angle of the mirror group 1-1 accordingly.

Further, the transceiver lens array module 2 includes: a coupling lens unit 21, a divergence angle control unit 22 and an optical fiber light control unit 23; the divergence angle control unit 22 is connected to the coupling lens unit 21 and the divergence angle control unit 22 respectively, the divergence angle control unit 22 is further connected to the signal transmission module 6, the optical fiber light control unit 23 is further connected to the array phase detection module 3 and the array characteristic splitting module 4 respectively. The coupling lens unit 21 is configured to couple the angle-adjusted laser 8 into the plurality of beams of the optical fiber light, and transmit the plurality of beams of the optical fiber light to the divergence angle control unit 22. The divergence angle control unit 22 is configured to adjust the divergence angles of the plurality of beams of the optical fiber light according to the first characteristic information, and is configured to transmit the plurality of beams of the optical fiber light to the optical fiber light control unit 23. The light control unit 23 is configured to divide the plurality of beams of the optical fiber into the plurality of beams of the first optical fiber light and the plurality of beams of the second optical fiber light, and then transmit the plurality of beams of the first optical fiber light to the array phase detection module 3, transmit the plurality of beams of the second optical fiber light to the array characteristic splitting module 4, and the divergence angle refers to a beam width.

Specifically, after the mirror group 1-1 sends the angle-adjusted laser 8 to the coupling lens unit 21, first, the coupling lens unit 21 performs coupling processing to obtain the plurality of beams of the optical fiber light, and transmit the plurality of beams of the optical fiber light to the divergence angle control unit 22. Then, the divergence angle control unit 22 transmits the plurality of beams of the optical fiber light to the optical fiber control unit 23. Moreover, the optical fiber light control unit 23 divides the plurality of beams of the optical fiber light into the plurality of beams of the first optical fiber light and the plurality of beams of the second optical fiber light, and transmits the plurality of beams of the first optical fiber light to the array phase detection module 3. At the same time, the optical fiber light control unit 23 transmits the plurality of beams of the second optical fiber to the array characteristic splitting module 4. And then, after the array phase detection module 3 calculates the plurality of beams of the first optical fiber light, the plurality of different first characteristic information is correspondingly obtained, and the first characteristic information is transmitted to the divergence angle control unit 22 through the information transmission module. Finally, the divergence angle control unit 22 correspondingly adjusts the divergence angles of the plurality of the optical fiber light according to the first characteristic information.

In the present application, the angle-adjusted laser 8 is firstly coupled through the coupling lens unit 21 to obtain the plurality of beams of the optical fiber light, and then the divergence angle control unit 22 adjusts the divergence angles of the plurality of beams of the optical fiber light according to the first characteristic information of the optical fiber light, thereby realize adjusting the divergence angles of the optical fiber light according to the first characteristic information, which effectively increasing the gain of receiving and sending the light beams. At the same time, the optical fiber light control unit 23 divides the plurality of beams of the optical fiber light to obtain the plurality of beams of the first optical fiber light and the plurality of beams of the second optical fiber light for separate transmission and analysis, thereby efficiently performs data collection while and transmission simultaneously to the plurality of beams of the optical fiber light, which ultimately increases an efficiency of adjusting the relative angle of the laser 8.

Further, the coupling lens unit 21 includes: N coupling lens groups 2-1; and each of the coupling lens groups 2-1 is connected to the divergence angle control unit 22.

Specifically, each of the coupling lens groups 2-1 couples the angle-adjusted laser 8 to obtain the optical fiber light, and transmits the optical fiber light to the divergence angle control unit 22 for the next operation.

Further, the divergence angle control unit 22 includes: N divergence angle adjusters 2-2 and N divergence angle controllers 2-3; each of the divergence angle adjusters 2-2 is connected to each of the coupling lens groups 2-1 respectively, each of the divergence angle controllers 2-3 is connected to the optical fiber light control unit 23.

Specifically, after the coupling lens group 2-1 couples the angle-adjusted laser 8 to obtain the optical fiber light, the coupling lens group 2-1 transmits the optical fiber light to the divergence angle adjuster 2-2, the beam divergence adjuster 2-2 transmits the optical fiber light to the optical fiber light control unit 23, so that the optical fiber light control unit 23 can perform the next operation.

However, the divergence angle controller 2-3 will control the divergence angle adjuster 2-2 to adjust the divergence angle of the optical fiber light according to the plurality of different first characteristic information, and obtain the divergence angle-adjusted optical fiber light, and transmit the divergence angle-adjusted optical fiber light to the optical fiber light control unit 23 so that the optical fiber light control unit 23 can perform the next operation.

In the present application, the divergence angle controller 2-3 controls the divergence angle adjuster 2-2 to correspondingly adjust the divergence angles of the plurality of beams of the optical fiber light according to the first characteristic information, realizing controlling the divergence angle adjuster 2-2 to correspondingly adjust the divergence angles of the plurality of beams of the optical fiber light according to the different first characteristic information, that is, realizing that flexibly adjusting the divergence angles of the laser 8 sent by the plurality of the satellites coordinately. Therefore, the efficiency of simultaneous process to the plurality of light beams respectively is effectively improved.

Further, the optical fiber control unit 23 includes: N optical fibers 2-4, N third optical fiber controllers 2-5, and N optical circulators 2-6; each of the optical fiber controllers 2-5 is connected to each of the optical fibers 2-4 respectively, each of the optical circulators 2-6 is connected to the transceiver lens array module 2, and each of the optical circulators 2-6 is further connected to the array characteristic splitting module 4.

Specifically, the divergence angle controller 2-3 transmits the optical fiber light to the third optical fiber controller 2-5 through the optical fiber 2-4, and then, the third optical fiber controller 2-5 divides the optical fiber light into the first optical fiber light and the second optical fiber light, transmits the first optical fiber light to the array phase detection module 3, and simultaneously transmits the optical fiber light to the optical circulator 2-6. And then the optical circulator 2-6 transmits the second optical fiber light to the array characteristic splitting module 4 for the next operation.

The optical circulator 2-6 is a passive device, does not need electric-control, and is mainly configured to isolate the light beams. The optical circulator 2-6 is directional and has three ports 1, 2 and 3. If the light beams enter from port 1, it will exit from the port 2, if it enters from port 3, it will exit from port 1, but if it enters from port 1, it will not exit from port 3. Based on this principle, it plays a role of separating sending and receiving.

Further, the array phase detection module 3 includes: an array detector 3-1, and a phase processor 3-2; the array detector 3-1 is connected to the optical fiber light control unit 23 and the phase processor 3-2 respectively, and the phase processor 3-2 is further connected to the signal transmission module 6.

Specifically, when the third optical fiber controller 2-5 divides the optical fiber light into the first optical fiber light, the third optical controller 2-5 transmits the first optical fiber light to the array detector 3-1, and then the array detector 3-1 transmits the first optical fiber light to the phase processor 3-2. At the same time, the array detector 3-1 will detect a light intensity information of the plurality of beams of the first optical fiber light, and transmit the light intensity information to the phase processor 3-2. Moreover, the phase processor 3-2 will calculate the relative angles of the A satellite 10-2, the B satellite 10-3, the N satellite 10-4 and the Z satellite 10-1 according to the plurality of beams of the first optical fiber light respectively to obtain the first characteristic information, that is, obtain the relative angle information, and the first characteristic information and the light intensity information are transmitted to the signal transmission module 6, so that the signal transmission module 6 can perform the next operation.

In the present application, the first optical fiber light is detected by the array detector 3-1, and then transmitted to the phase processing module. The phase processing module then calculates the relative angles between the A satellite 10-2, the B satellite 10-3, the N satellite 10-4 and the Z satellite 10-1 to obtain the first characteristic signal according to the plurality of beams of the first optical fiber light, so as to finally adjust the angles of the mirror groups 1-1 and the divergence angles of the plurality of beams of the optical fiber light according to the first characteristic information, that is, an angle adjustment feedback signal is generated by the phase processing module to adjust the angles of the mirror groups 1-1 and the divergence angles of the plurality of beams of the optical fiber light in time. Thus, the light beams are received or sent as many as possible, which effectively increases the gain of receiving and sending the beam.

Further, the array characteristic splitting module 4 includes: N polarization wavelength detectors 4-1, N polarization wavelength splitters 4-2 and a splitting controller 4-3. Each of the polarization wavelength detectors 4-1 is connected to the optical fiber control unit 23 and each polarization wavelength splitters 4-2 respectively, each of the polarization wavelength splitters 4-2 is further connected to the splitting controller 4-3 and the beam switching array module 5 respectively, and the splitting controller 4-3 is further connected to the signal transmission module 6.

Specifically, after the third optical fiber controller 2-5 transmits the second optical fiber to the optical circulator 2-6, first, the optical circulator 2-6 transmits the second optical fiber to the polarization wavelength detector 4-1, and then the polarization wavelength detector 4-1 detects the polarization wavelength characteristics of the second optical fiber light to obtain the second characteristic information, that is, obtain the polarization wavelength characteristic information, and transmits the second characteristic information to the splitting controller 4-3 through the polarization wavelength splitter 4-2. At the same time, the second optical fiber light is transmitted to the beam switching array module 5 through the polarization wavelength splitter 4-2, so that the beam switching array module 5 may perform the next operation. Finally, the splitting controller 4-3 transmits the second characteristic information to the signal transmission module 6, so that the signal transmission module 6 may perform the next operation.

In the present application, after the polarization wavelength characteristic of the second optical fiber is detected by the polarization wavelength detector 4-1, the second characteristic information is obtained, so as to finally control the plurality of beams of the optical fiber light to be demodulated into the baseband signal 9 via the first path or to be forwarded via the second path according to the second characteristic information, that is, the characteristic feedback signal is generated by the polarization wavelength detector 4-1 to control the second optical fiber light via different paths for demodulation or forwarding correspondingly. Therefore, there is no need to perform electrical demodulation on all the lasers 8, thereby reducing the system power-consumption and system complexity effectively.

Further, the signal transmission module 6 includes: a high-speed bus 6-1; the high-speed bus 6-1 is connected to the optical field array control module 1, the divergence angle control unit 22, the array phase detection module 3, the splitting controller 4-3 and the communication controller 5-5 respectively.

Specifically, when the phase processor 3-2 transmits the first characteristic information and the light intensity information to the high-speed bus 6-1, then the high-speed bus 6-1 transmits the first characteristic information and the light intensity information to the divergence angle controller 2-3 and the high-precision controller 1-3 for the next operation.

After the polarization wavelength detector 4-1 transmits the second characteristic information to the splitting controller 4-3 through the polarization wavelength splitter 4-2, the splitting controller 4-3 transmits the second characteristic information to the high-speed bus 6-1, and then the high-speed bus 6-1 transmits the second characteristic information to the beam switching array module 5, so that the beam switching array module 5 may perform the next operation.

In the present application, high-speed bus 6-1 transmits electric signals such as the first characteristic information, the second characteristic information, and the light intensity signal intensively and efficiently, which may effectively save transmission time, simplify layout, and reduce complexity of the system.

Further, the beam switching array module 5 includes: N optical switches 5-1, N communication transceiver boards 5-2, N first optical fiber controllers 5-3, N second optical fiber controllers 5-4, and a communication controller 5-5. Each of the optical switches 5-1 is connected to each of the polarization wavelength splitters 4-2 and each of the first optical fiber controllers 5-3 respectively, each of the optical switches 5-1 is further connected to the communication controller 5-5, each of the first optical fiber controllers 5-3 is further connected to each of the second optical fiber controllers 5-4 and each of the communication transceiver boards 5-2, and each of the second optical fiber controllers 5-4 is further connected to the optical fiber light control unit 23. The N optical switches 5-1 together form an array of the optical switches 5-1; the first path is from the optical switch 5-1 to the first optical fiber controller 5-3 and then to the communication transceiver board 5-2. The second path is from the optical switch 5-1 to the first optical fiber controller 5-3 to the second optical fiber controller 5-4, to the optical circulator 2-6 and then to the corresponding connected array element 7. The array element 7 is composed of the array mirror group 1-1, the array displacement actuator 1-2, the coupling lens group 2-1 and the divergence angle adjuster 2-2 to form an independent array element 7 in the Z satellite 10-1 networking system.

Specifically, after the polarization wavelength detector 4-1 transmits the second optical fiber to the polarization wavelength splitter 4-2, firstly, the polarization wavelength splitter 4-2 transmits the second optical fiber light to the optical switch 5-1. At the same time, the communication controller 5-5 will also receive the second characteristic information transmitted through the high-speed bus 6-1, and then the communication controller 5-5 compares the polarization and wavelength characteristic information (preset polarization wavelength characteristic information) of the Z satellite 10-1 queried in the dynamic routing table with the first characteristic information.

If the second characteristic information is the same as the preset polarization wavelength characteristic information, the communication controller 5-5 controls the optical switch 5-1 array to directly transmit the second optical fiber to the communication transceiver board 5-2 through the first optical fiber controller 5-3, and the communication transceiver board 5-2 demodulates the second optical fiber light into the baseband signal 9 and sends it out. If the second characteristic information is different from the preset polarization wavelength characteristic information, the communication controller 5-5 further performs routing calculation according to the ephemeris and the real-time position of the array element 7, and then the communication controller 5-5 controls the array of the optical switch 5-1 to transmit the second optical fiber light to the array element 7 through the first optical fiber controller 5-3, the second optical fiber controller 5-4 and the optical circulator 2-6 sequentially. Finally, the array element 7 forwards the second optical fiber light, that is, finally the array mirror group 1-1 forwards the second optical fiber light.

Figure 3:
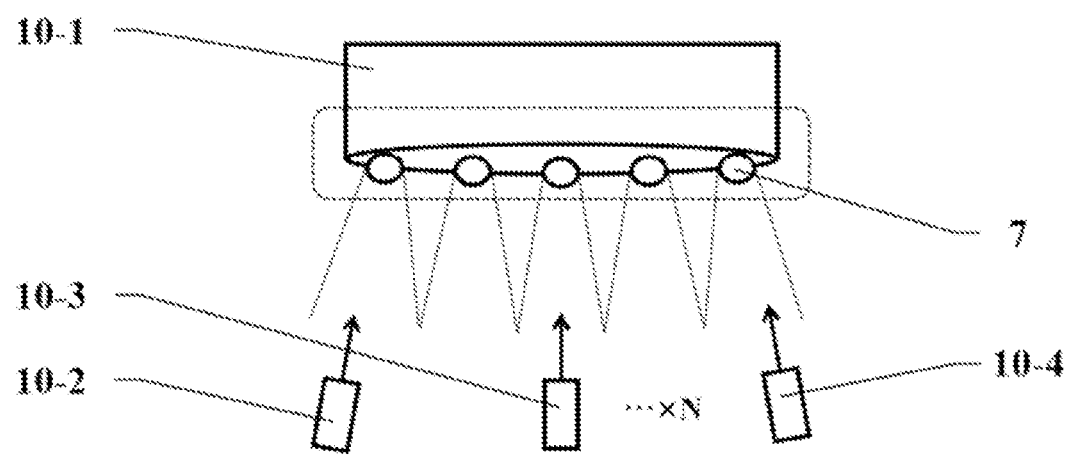
FIG. 3 is a schematic array element distribution view of the many-to-many laser communication networking device working in a broadcast mode of the present application.

In order to better understand the present application, the working principle of the many-to-many laser communication networking device of the present application will be described in detail below in conjunction with FIG. 1 and FIG. 2:

When the plurality of satellites A, B . . . N receive the task of communicating with the Z satellite 10-1 simultaneously, the A satellite 10-2, the B satellite 10-3 . . . the N satellite 10-4 will send the communication beams (the laser 8) in the direction of the Z satellite 10-1 according to the rough position information on the ephemeris (the ephemeris is the satellite position at each moment predicted by the satellite TT&C). The initial state of the Z satellite 10-1 networking system (the many-to-many laser communication networking device in the present application) is the broadcast mode, and the arrangement of the array element 7 is shown in FIG. 3. In this state, first, after the N array elements 7 receive the plurality of beams of the laser 8 with different angles sent by the different satellites, the incident angles adjustment and the coupling are performed to obtain the plurality of beams of the optical fiber light, that is, after the N mirror groups 1-1 receive the plurality of beams of the laser 8 with different angles sent by the different satellites, the plurality of beams of the laser 8 with different angles are reflected to obtain the plurality of beams of the angle-adjusted laser 8. The plurality of beams of the angle-adjusted laser 8 are reflected and transmitted to the corresponding coupling lens group 2-1. The coupling lens group 2-1 couples the angle-adjusted laser 8 to obtain the plurality of beams of the optical fiber light, and transmits the plurality of beams of the optical fiber light to the correspondingly connected third optical fiber controller 2-5 through the divergence angle adjuster 2-2.

Figure 4:
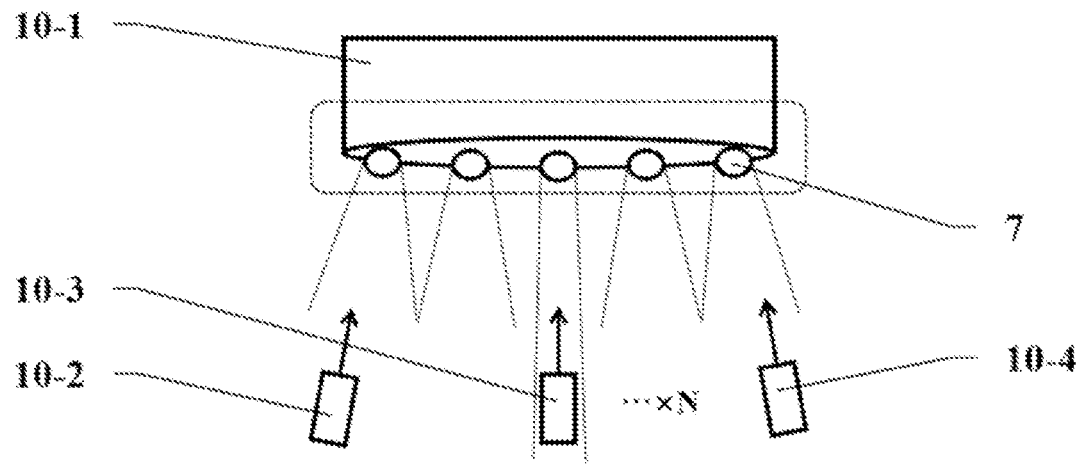
FIG. 4 is a schematic array element distribution view after adjusting a divergence angle of the many-to-many laser communication networking device of the present application.
Figure 5:
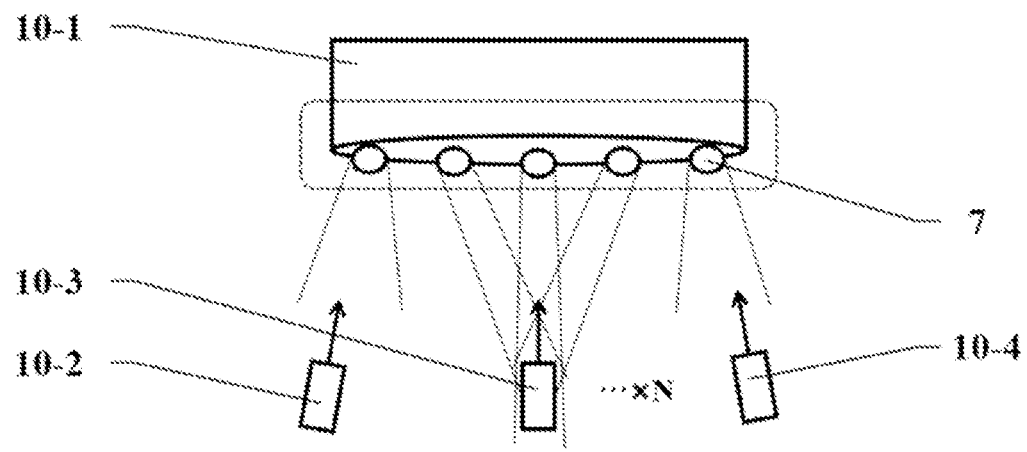
FIG. 5 is a schematic distribution view after adjusting an array element of the many-to-many laser communication networking device of the present application.

Then, the third optical fiber controller 2-5 divides the optical fiber light into two to obtain the first optical fiber light and the second optical fiber light, transmits the first optical fiber light to the array phase detector 3-1, and simultaneously transmits the optical fiber light to the optical circulator 2-6. Then, the array detector 3-1 transmits the first optical fiber light to the phase processor 3-2, at the same time, the array detector 3-1 will detect the plurality of beams of the first optical fiber light, and after the light intensity information is obtained, transmit it to the phase processor 3-2, and the phase processor 3-2 will respectively calculate the relative angles of A satellite 10-2, the B satellite 10-3 . . . the N satellite 10-4 and Z satellite 10-1 according to the plurality of beams of the first optical fiber light, that is, the phase processor 3-2 receives weak optical signals from the plurality of satellites A, B . . . N to obtain the relative angle information (the first characteristic information), and send the relative angle information and the light intensity information to the high-speed bus 6-1. The high-speed bus 6-1 sends the relative angle information and the light intensity information together to the divergence angle controller 2-3 and the high-precision controller 1-3. The high-precision controller 1-3 controls the array displacement actuator 1-2 to adjust the angle of the mirror group 1-1 according to the relative angle information. The divergence angle controller 2-3 will control the divergence angle adjuster to adjust the divergence angle of the angle-adjusted laser 8 according to the relative angle information. At this time, the arrangement of the array elements 7 is shown in FIG. 4, at the same time, the beam divergence controller 2-3 and the high-precision controller 1-3 schedule and control their respective quantities according to the light intensity information, that is, schedule and control the quantity of the array elements 7 according to the light intensity information, then the arrangement of the array elements 7 is as shown in FIG. 5.

Secondly, the optical circulator 2-6 transmits the second optical fiber light to the polarization wavelength detector 4-1, and the polarization wavelength detector 4-1 detects the polarization wavelength characteristic of the second optical fiber light to obtain the polarization wavelength characteristic information (the second characteristic information), the polarization wavelength characteristic information is transmitted to the splitting controller 4-3 through the polarization wavelength splitter 4-2, and the second optical fiber light is transmitted to the optical switch 5-1 through the polarization wavelength splitter 4-2. The splitting controller 4-3 transmits the polarization wavelength characteristic information to the communication controller 5-5 through the high-speed bus 6-1.

Finally, the communication controller 5-5 compares the polarization and wavelength characteristic information (the preset polarization wavelength characteristic information) of the Z satellite 10-1 queried in the dynamic routing table with the first characteristic information: if the second characteristic information is the same as the preset polarization wavelength characteristic information, the communication controller 5-5 controls the optical switch 5-1 array to directly transmit the second optical fiber light to the communication transceiver board 5-2 through the first optical fiber controller 5-3, and the communication transceiver board 5-2 demodulates the second optical fiber into a baseband signal 9 and sends it out. If the second characteristic information is different from the preset polarization wavelength characteristic information, the communication controller 5-5 further performs routing calculation according to the ephemeris and the real-time position of the array element 7, and then the communication controller 5-5 controls the array of the optical switch 5-1 to transmit the second optical fiber light to the corresponding array element 7 through the first optical fiber controller 5-3, the second optical fiber controller 5-4 and the optical circulator 2-6 sequentially. Finally, the array element 7 forwards the second optical fiber light, that is, finally the array mirror group 1-1 forwards the second optical fiber light. According to the principle of reversible optical path, the transmission of laser 8 is the same, thereby forming a two-way full-duplex networking communication system.

Figure 6:
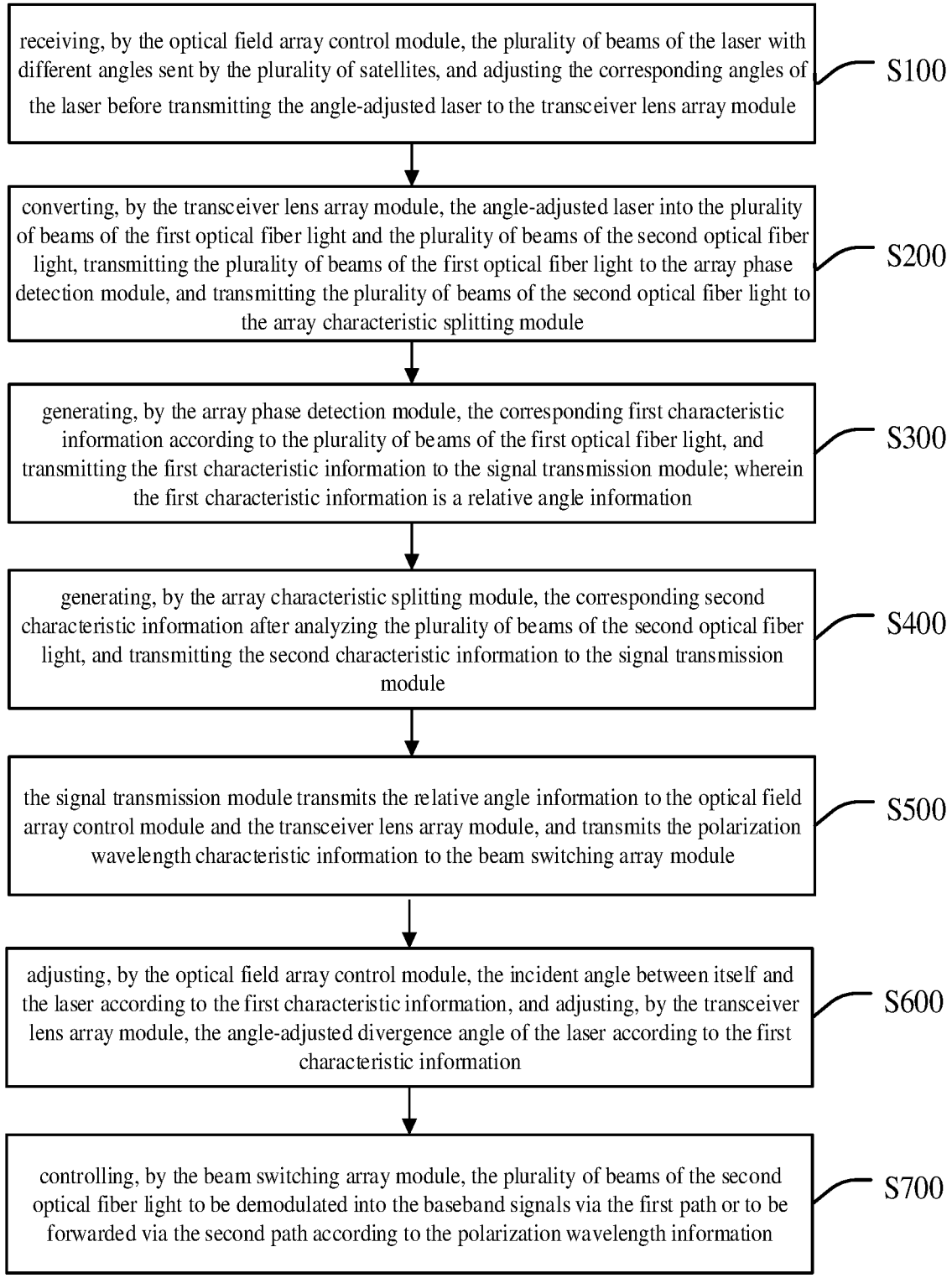
FIG. 6 is a schematic flowchart of the many-to-many laser communication networking method according to an embodiment of the present application.

Further, as shown in FIG. 6, the present application provides a many-to-many laser communication networking method based on the above-mentioned many-to-many laser communication networking device. The many-to-many laser communication networking method includes the following operations:

S100, receiving, by the optical field array control module 1, the plurality of beams of the laser with different angles sent by the plurality of satellites, and adjusting the corresponding angles of the laser 8 before transmitting the angle-adjusted laser 8 to the transceiver lens array module 2.

Specifically, when the plurality of satellites A, B . . . N receive the task of communicating with Z satellite 10-1 at the same time, the plurality of satellites A, B . . . N will send communication beams in the direction of the Z satellite 10-1 according to the rough position information on the ephemeris. After the array phase detection module 3 receives the plurality of beams of the laser 8 with different angles from the plurality of satellites A, B . . . N, the angle-adjusted laser 8 is transmitted to the transceiver lens array module 2, thereby realizing separately adjusting the plurality of beams of the laser 8 with different angles, so that the laser 8 may be transmitted according to a predetermined route.

S200, converting, by the transceiver lens array module 2, the angle-adjusted laser into the plurality of beams of the first optical fiber light and the plurality of beams of the second optical fiber light, transmitting the plurality of beams of the first optical fiber light to the array phase detection module 3, and transmitting the plurality of beams of the second optical fiber light to the array characteristic splitting module 4.

Specifically, the transceiver lens array module 2 couples the laser 8 and divides it to obtain the plurality of beams of the first optical fiber light and the plurality of beams of the second optical fiber light, and transmits the plurality of beams of the first optical fiber light to the array phase detection module 3, and transmits the plurality of beams of the second optical fiber light to the array characteristic splitting module 4, so that the laser 8 is coupled and divided to obtain different optical fiber light, so as to process respectively.

Figure 7:
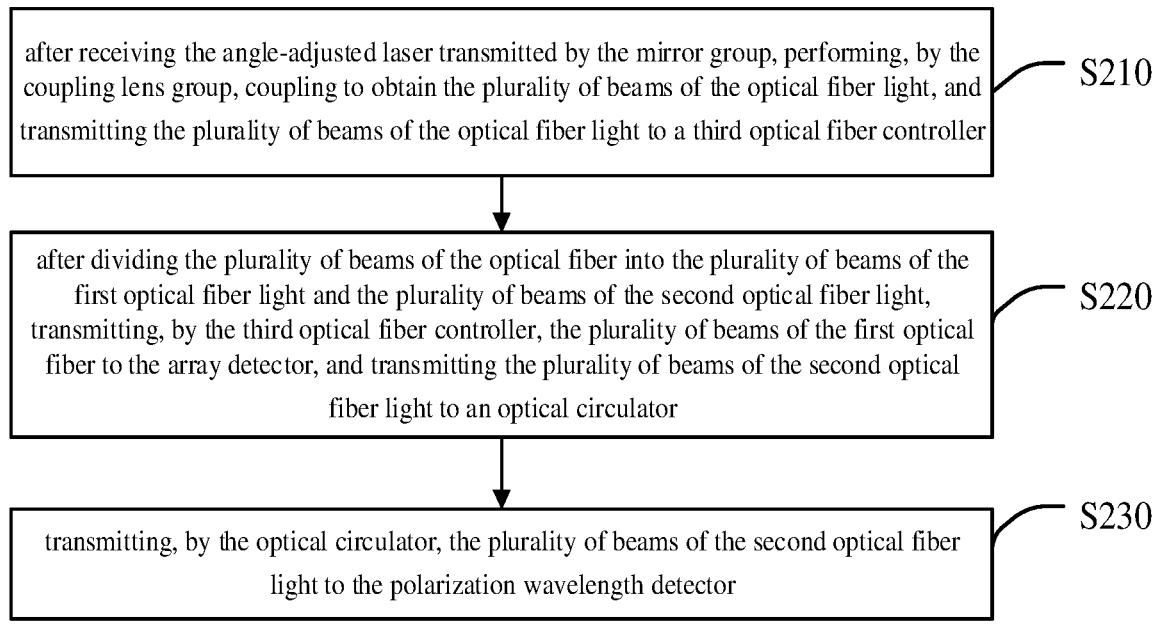
FIG. 7 is a schematic flowchart of operation S200 in the many-to-many laser communication networking method according to the embodiment of the present application.

Further, as shown in FIG. 7, the operation of converting, by the transceiver lens array module 2, the angle-adjusted laser into the plurality of beams of the first optical fiber light and the plurality of beams of the second optical fiber light, transmitting the plurality of beams of the first optical fiber light to the array phase detection module 3, and transmitting the plurality of beams of the second optical fiber light to the array characteristic splitting module 4, specifically includes:

S210, after receiving the angle-adjusted laser 8 transmitted by the mirror group 1-1, performing, by the coupling lens group 1-1, coupling to obtain the plurality of beams of the optical fiber light, and transmitting the plurality of beams of the optical fiber light to a third optical fiber controller 2-5;

S220, after dividing the plurality of beams of the optical fiber into the plurality of beams of the first optical fiber light and the plurality of beams of the second optical fiber light, transmitting, by the third optical fiber controller 2-5, the plurality of beams of the first optical fiber to the array detector 3-1, and transmitting the plurality of beams of the second optical fiber light to an optical circulator 2-6;

S230, transmitting, by the optical circulator 2-6, the plurality of beams of the second optical fiber light to the polarization wavelength detector 4-1.

Specifically, after the reflection mirror group 1-1 reflects and sends the plurality of angle-adjusted laser 8 to the corresponding coupling lens group 2-1, first, the coupling lens group 2-1 couples the angle-adjusted laser 8 to obtain the optical fiber light, and transmit the optical fiber light to the correspondingly connected third optical fiber controller 2-5 through the divergence angle adjuster 2-2. Then, the third optical fiber controller 2-5 divides the optical fiber light into two to obtain the first optical fiber light and the second optical fiber light, and then transmits the first optical fiber light to the array detector 3-1 and transmits the second optical fiber light to the optical circulator 2-6. The array detector 3-1 transmits the first optical fiber light to the phase processor 3-2, the optical circulator 2-6 transmits the second optical fiber light to the polarization wavelength detector 4-1, so as to truly divide the optical fiber light into two for processing respectively.

As further shown in FIG. 6, S300, generating, by the array phase detection module 3, the corresponding first characteristic information according to the plurality of beams of the first optical fiber light, and transmitting the first characteristic information to the signal transmission module 6; wherein the first characteristic information is a relative angle information.

Specifically, the array phase detection module 3 calculates the relative angles of the A satellite 10-2, the B satellite 10-3 . . . the N satellite 10-4 and the Z satellite 10-1 respectively according to the plurality of beams of the first optical fiber light, that is, the phase processor 3-2 receives weak light signals from the plurality of satellites A, B . . . N to obtain the plurality of different relative angle information (the first characteristic information), and the relative angle information is transmitted to the signal transmission module 6, so that the signal transmission module 6 transmits the relative angle information to the corresponding module, realizing obtaining the angles between this satellite and other satellites to adjust the feedback signal (the relative angle information), thereby adjusting the incident angle and divergence angle of the laser 8 accordingly, and increasing the gain of the communication beam effectively.

Figure 8:
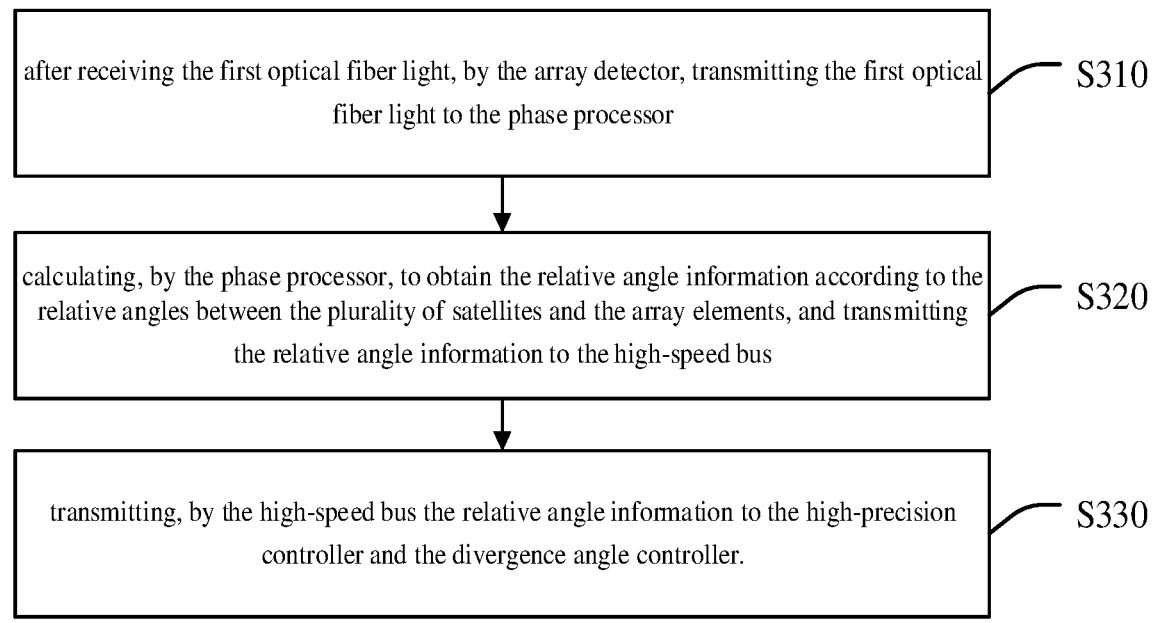
FIG. 8 is a schematic flowchart of operation S300 in the many-to-many laser communication networking method according to the embodiment of the present application.

Further, as shown in FIG. 8, the operation of generating, by the array phase detection module 3, the corresponding first characteristic information according to the plurality of beams of the first optical fiber light, and transmitting the first characteristic information to the signal transmission module 6; the first characteristic information is a relative angle information, specifically including:

S310, after receiving the first optical fiber light, by the array detector 3-1, transmitting the first optical fiber light to the phase processor 3-2;

S320, calculating, by the phase processor 3-2, to obtain the relative angle information according to the relative angles between the plurality of satellites and the array elements 7, and transmitting the relative angle information to the high-speed bus 6-1;

S330, transmitting, by the high-speed bus 6-1 the relative angle information to the high-precision controller 1-3 and the divergence angle controller 2-3. The array element 7 includes the mirror group 1-1, the array displacement actuator 1-2, the coupling lens group 2-1 and the divergence angle adjuster 2-2.

Specifically, the third optical fiber controller 2-5 splits the optical fiber light into the first optical fiber light and the second optical fiber light, and after the first optical fiber light is transmitted to the array detector 3-1, the array detector 3-1 transmits the first optical fiber light to the phase processor 3-2. At the same time, the array detector 3-1 detects the plurality of beams of the first optical fiber light, and after obtaining the light intensity information, it is transmitted to the phase processor 3-2, and the phase processor 3-2 will respectively calculate the relative angle of the A satellite 10-2, the B satellite 10-3 . . . the N satellite 10-4 and the array elements 7 of the Z satellite 10-1 to obtain the relative angle information, and transmit the relative angle information and the light intensity information to the high-speed bus 6-1. Then the high-speed bus 6-1 sends the relative angle information and the light intensity information to the divergence angle controller 2-3 and the high-precision controller 1-3, so that the divergence angle controller 2-3 and the high-precision controller 1-3 carry out the next operation, realizing obtaining the angle adjustment feedback signal according to the relative angle information of the A satellite 10-2, the B satellite 10-3 . . . the N satellite 10-4 and the array elements 7 of the Z satellite 10-1, so as to adjust the angle of the mirror group 1-1 and the divergence angle of the laser 8 accordingly, which effectively increases the gain of sending and receiving the light beam.

Further, as shown in FIG. 6, S400, generating, by the array characteristic splitting module 4, the corresponding second characteristic information after analyzing the plurality of beams of the second optical fiber light, and transmitting the second characteristic information to the signal transmission module 6, the second characteristic information is a polarization wavelength information.

Specifically, the array characteristic splitting module 4 analyzes the polarization and wavelength characteristics of the plurality of beams of the second optical fiber light and correspondingly generates the plurality of different second characteristic information, that is, generates the plurality of different polarization wavelength characteristics information, and transmits the second characteristic information to the signal transmission module 6, realizing generating the plurality of different characteristic feedback signals (the polarization wavelength characteristic information) after analyzing the polarization and wavelength characteristics of the plurality of beams of the second optical fiber light, thereby determining whether to demodulate or forward the second optical fiber light according to the second characteristic information.

S500, the signal transmission module 6 transmits the relative angle information to the optical field array control module 1 and the transceiver lens array module 2, and transmits the polarization wavelength characteristic information to the beam switching array module 5.

Specifically, when the array phase detection module 3 correspondingly generates the plurality of different relative angle information (the first characteristic information) according to plurality of beams of the first fiber light, first, the array phase detection module 3 transmits the relative angle information to the signal transmission module 6, and the signal transmission module 6 transmits the relative angle information to the optical field array control module 1 and the transceiver lens array module 2.

After the array characteristic splitting module 4 analyzes the polarization and wavelength characteristics of the plurality of beams of the second optical fiber light and correspondingly generates the plurality of different polarization wavelength characteristic information, first, the array characteristic splitting module 4 transmits the polarization wavelength characteristic information (the second characteristic information) to the signal transmission module 6, and then the signal transmission module 6 transmits it to the beam switching array module 5. In the present application, the relative angle information and the polarization wavelength characteristic information are transmitted to the corresponding modules respectively only through the information transmission modules, thereby effectively increasing the signal transmission rate.

S600, adjusting, by the optical field array control module 1, the incident angle between itself and the laser 8 according to the first characteristic information, and adjusting, by the transceiver lens array module 2, the angle-adjusted divergence angle of the laser 8 according to the first characteristic information.

Specifically, after the signal transmission module 6 transmits the relative angle information to the optical field array control module 1 and the transceiver lens array module 2, the optical field array control module 1 adjusts the incident angle between itself and the laser 8 according to the first characteristic information, and at the same time, the transceiver lens array module 2 adjusts the angle-adjusted divergence angle of the laser 8 according to the first characteristic information, thereby realizing adjusting the incident angle and the divergence angle of the laser 8 according to the angle information between the plurality of satellites and this satellite accordingly, so that the laser 8 may be transmitted according to a preset propagation route, and the divergence angle of the laser 8 may be adjusted accordingly, which effectively increases the gain of sending and receiving space beams.

Figure 9:
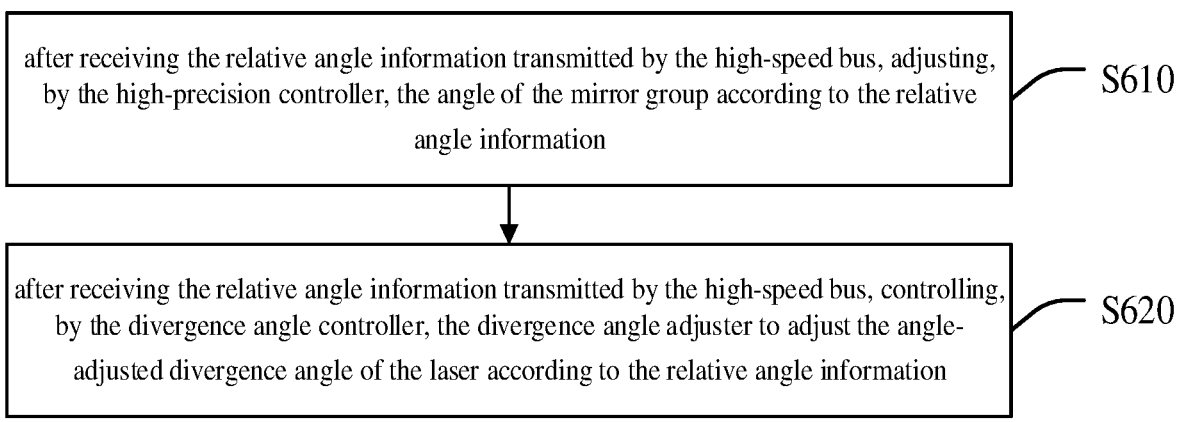
FIG. 9 is a schematic flowchart of operation S600 in the many-to-many laser communication networking method according to the embodiment of the present application.

Further, as shown in FIG. 9, the operation of adjusting, by the optical field array control module, the incident angle between itself and the laser according to the first characteristic information, and adjusting, by the transceiver lens array module, the angle-adjusted divergence angle of the laser according to the first characteristic information specifically includes:

S610, after receiving the relative angle information transmitted by the high-speed bus 6-1, adjusting, by the high-precision controller 1-3, the angle of the mirror group 1-1 according to the relative angle information;

S620, after receiving the relative angle information transmitted by the high-speed bus 6-1, controlling, by the divergence angle controller 2-3, the divergence angle adjuster to adjust the angle-adjusted divergence angle of the laser 8 according to the relative angle information.

Specifically, after the high-speed bus 6-1 transmits the relative angle information and the light intensity information to the divergence angle controller 2-3 and the high-precision controller 1-3, the high-precision controller 1-3 controls the array displacement actuator 1-2 to adjust the angle of the mirror group 1-1 according to the relative angle information. The divergence angle controller 2-3 controls the divergence angle adjuster to adjust the angle-adjusted divergence angle of the laser 8, thereby realizing adjusting the angle of the mirror group 1-1 according to the relative angle information between the A satellite 10-2, the B satellite 10-3 . . . the N satellite 10-4 and the Z satellite 10-1, and adjusting the angle-adjusted divergence angle of the laser 8, so as to truly realize the omnidirectional reception (receiving in all directions), which effectively increases the gain of sending and receiving spatial light beams, and the divergence angle controller 2-3 and the high-precision controller 1-3 schedule and control the quantity of the array element 7 according to the light intensity information. The array elements 7 construct an equivalent aperture through conformal, so as to realize adaptively adjusting gain of the antenna.

Further, as shown in FIG. 6, S700, controlling, by the beam switching array module 5, the plurality of beams of the second optical fiber light to be demodulated into the baseband signals 9 via the first path or to be forwarded via the second path according to the polarization wavelength information.

Specifically, after the array characteristic splitting module 4 analyzes the polarization and wavelength characteristics of plurality of beams of the second optical fiber light and correspondingly generates the plurality of different polarization wavelength characteristic information, the array characteristic splitting module 4 transmits the second characteristic information to the beam switching array module 5 through the signal transmission module 6, and then, the beam switching array module 5 compares the second characteristic information with the polarization and wavelength characteristic information of the Z satellite 10-1 according to the polarization and wavelength characteristics of the Z satellite 10-1 itself in the dynamic routing table, that is, comparing with the preset polarization wavelength characteristic information.

If the second characteristic information is the same as the preset polarization wavelength characteristic information, the beam switching array module 5 controls the plurality of beams of the second optical fiber light to be demodulated into the baseband signal 9 via the first path, and then sends it out. If the second characteristic information is different from the preset polarization wavelength characteristic information, the beam switching array module 5 controls the plurality of beams of the second optical fiber light to be forwarded through the transceiver lens array module 2 and the optical field array control module 1, sequentially via the second path, which realizes the selective communication and forwarding of the beams according to the characteristics of the spatial beam, which avoids photoelectric demodulation to all the spatial beam information, thereby greatly reducing system power-consumption and system complexity, expanding the proportion of the optical domain in the laser 8 communication system.

Figure 10:
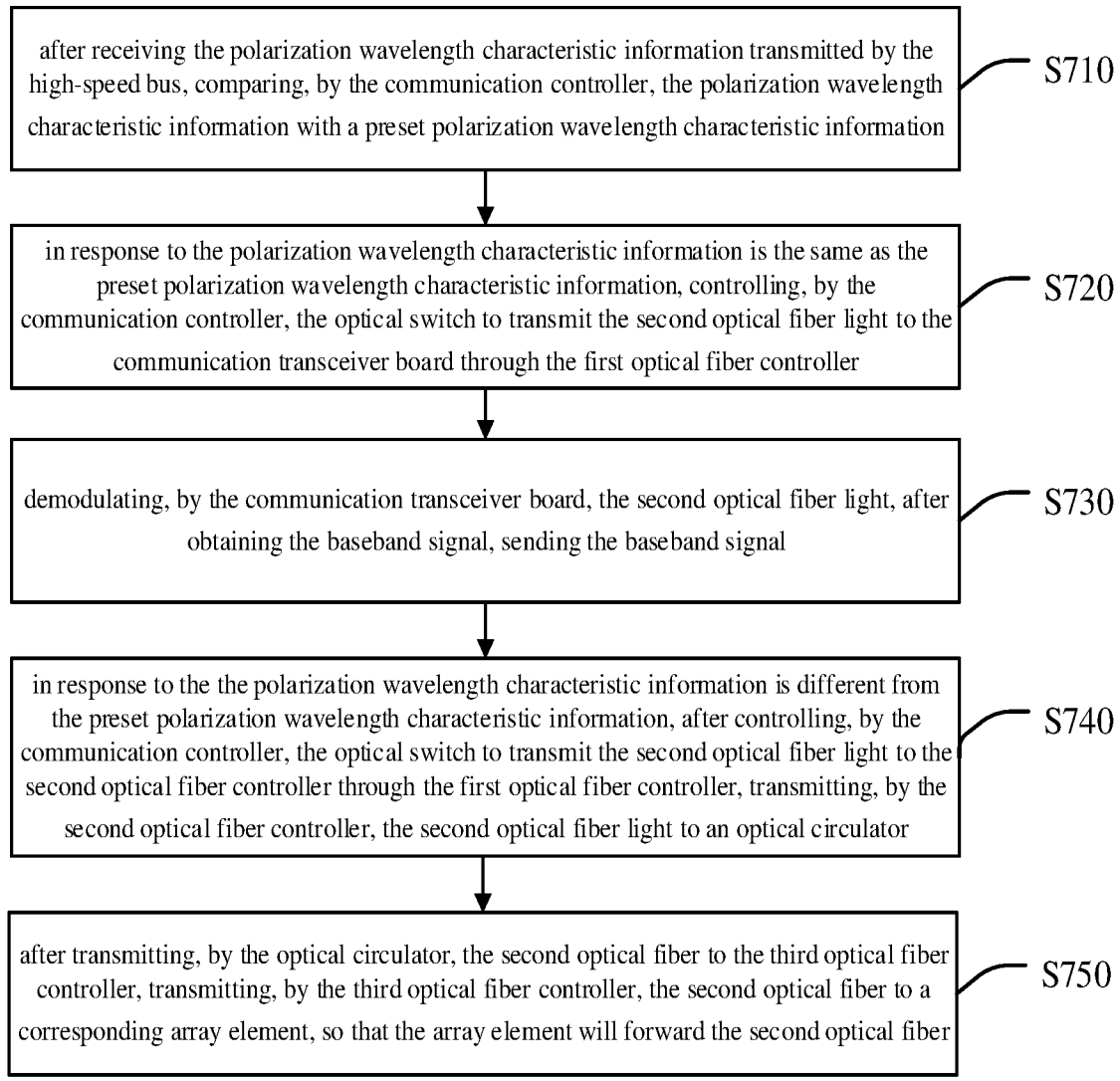
FIG. 10 is a schematic flowchart of operation S700 in the many-to-many laser communication networking method according to the embodiment of the present application.

Further, as shown in FIG. 10, the beam switching array module 5 controls the operation of controlling the plurality of beams of the second optical fiber light to be demodulated into the baseband signals via the first path or to be forwarded via the second path according to the polarization wavelength information, specifically include:

S710, after receiving the polarization wavelength characteristic information transmitted by the high-speed bus 6-1, comparing, by the communication controller 5-5, the polarization wavelength characteristic information with a preset polarization wavelength characteristic information;

S720, in response to that the polarization wavelength characteristic information is the same as the preset polarization wavelength characteristic information, controlling, by the communication controller 5-5, the optical switch 5-1 to transmit the second optical fiber light to the communication transceiver board 5-2 through the first optical fiber controller 2-4;

S730, demodulating, by the communication transceiver board 5-2, the second optical fiber light, after obtaining the baseband signal 9, sending the baseband signal 9;

S740, in response to that the polarization wavelength characteristic information is different from the preset polarization wavelength characteristic information, after controlling, by the communication controller 5-5, the optical switch 5-1 to transmit the second optical fiber light to the second optical fiber controller through the first optical fiber controller, transmitting, by the second optical fiber controller, the second optical fiber light to an optical circulator 2-6;

S750, after transmitting, by the optical circulator 2-6, the second optical fiber to the third optical fiber controller 2-5, transmitting, by the third optical fiber controller 2-5, the second optical fiber to a corresponding array element 7, so that the array element 7 will forward the second optical fiber.

Specifically, after the optical splitting controller 4-3 transmits the polarization wavelength characteristic information to the high-speed bus 6-1, first, the high-speed bus 6-1 transmits the second characteristic information to the communication controller 5-5, and then, the communication controller 5-5 compares the polarization and wavelength characteristic information (preset polarization wavelength characteristic information) of Z satellite 10-1 queried in the dynamic routing table with the first characteristic information.

If the second characteristic information is the same as the preset polarization wavelength characteristic information, the communication controller 5-5 controls the optical switch 5-1 array to directly transmit the second optical fiber light to the communication transceiver board 5-2 through the first optical fiber light controller 5-3, and the communication transceiver board 5-2 demodulates the second optical fiber into the baseband signal 9 and sends it out; if the second characteristic information is different from the preset polarization wavelength characteristic information, the communication controller 5-5 further performs routing calculation according to the ephemeris and the real-time position of the array element 7, and then the communication controller 5-5 controls the array of the optical switch 5-1 to transmit the second optical fiber light to the corresponding array element 7.

Finally, the array element 7 forwards the second optical fiber light, that is, the array mirror group 1-1 finally forwards the second optical fiber light. And according to the principle of light reversibility, the transmission of laser 8 is the same, thereby forming a two-way full-duplex networking communication system.

In summary, the present application provides a many-to-many laser communication networking device and a many-to-many laser communication networking method, the device includes: an optical field array control module, a transceiver lens array module, an array phase detection module, an array characteristic splitting module, a beam switching array module and a signal transmission module. The optical field array control module is configured to receive the plurality of beams of a laser with different angles, and adjust the corresponding angles of the laser light. The transceiver lens array module is configured to convert the angle-adjusted laser beams into the plurality of beams of the second optical fiber light. The array characteristic optical splitting module is configured to analyze the second optical fiber to obtain the second characteristic information. The beam switching array module is configured to control the second optical fiber light to be demodulated into the baseband signal via the first path or to be forwarded via the second path through the second characteristic information. The beam switching array module controls the plurality of beams of the second optical fiber light according to the second characteristic information, and demodulates them into baseband signals through the first path or forwards them through the second path, so as to achieve flexible sending and receiving of plurality of beams of laser light at the same time and reduce power-consumption.

It can be understood that those skilled in the art can make equivalent replacements or changes according to the technical solutions and inventive concepts of the present application, and all these changes or replacements should belong to the protection scope of the appended claims of the present application.

What is claimed is:

1. A many-to-many laser communication networking device, comprising:
   an optical field array control module;
   a transceiver lens array module;
   an array phase detection module;
   an array characteristic splitting module;
   a beam switching array module; and
   a signal transmission module,
   wherein the transceiver lens array module, the array characteristic splitting module and the beam switching array module are sequentially connected, the signal transmission module is connected to the optical field array control module, the transceiver lens array module, the array characteristic splitting module and the beam switching array module respectively, and the transceiver lens array module is further connected to the array phase detection module;
   the optical field array control module is configured to receive a plurality of beams of a laser with different angles sent by a plurality of satellites, adjust corresponding angles of the laser, and transmit an angle-adjusted laser to the transceiver lens array module;
   the transceiver lens array module is configured to convert the angle-adjusted laser into a plurality of beams of a first optical fiber light and a plurality of beams of a second optical fiber light, transmit the plurality of beams of the first optical fiber light to the array phase detection module, and transmit the plurality of beams of the second optical fiber light to the array characteristic splitting module;
   the array phase detection module is configured to generate a plurality of different first characteristic information correspondingly according to the plurality of beams of the first optical fiber light, and transmit the first characteristic information to the signal transmission module;
   the array characteristic splitting module is configured to generate a plurality of different second characteristic information correspondingly after analyzing the plurality of beams of the second optical fiber light, and transmit the second characteristic information to the signal transmission module;
   the signal transmission module is configured to transmit the first characteristic information to the optical field array control module and the transceiver lens array module, and transmit the second characteristic information to the beam switching array module; and
   the beam switching array module is configured to control the plurality of beams of the second optical fiber light to be demodulated into baseband signals via a first path or forwarded via a second path according to the second characteristic information.

2. The many-to-many laser communication networking device of claim 1, wherein:
   the transceiver lens array module comprises a coupling lens unit, a divergence angle control unit, and an optical fiber light control unit;
   the divergence angle control unit is connected to the coupling lens unit and the optical fiber light control unit respectively, the divergence angle control unit is further connected to the signal transmission module, the optical fiber light control unit is further connected to the array phase detection module and the array characteristic splitting module;
   the coupling lens unit is configured to couple the angle-adjusted laser into the plurality of beams of the optical fiber light, and transmit the plurality of beams of the optical fiber light to the divergence angle control unit;
   the divergence angle control unit is configured to adjust divergence angles of the plurality of beams of the optical fiber light according to the plurality of different first characteristic information, and is configured to transmit the plurality of beams of optical fiber light to the optical fiber light control unit; and
   the optical fiber light control unit is configured to divide the plurality of beams of optical fiber light into the plurality of beams of the first optical fiber light and the plurality of beams of the second optical fiber light, transmit the plurality of beams of the first optical fiber light to the array phase detection module, and transmit the plurality of beams of the second optical fiber light to the array characteristic splitting module.

3. The many-to-many laser communication networking device of claim 1, wherein:
   the optical field array control module comprises N mirror groups, N array displacement actuators, and a high-precision controller; and
   each of the array displacement actuators is connected to each of the mirror groups one by one, each of the array displacement actuators is further connected to the high-precision controller, and the high-precision controller is further connected to the signal transmission module.

4. The many-to-many laser communication networking device of claim 2, wherein:
   the array phase detection module comprises an array detector, and a phase processor; and
   the array detector is connected to the optical fiber light control unit and the phase processor respectively, and the phase processor is further connected to the signal transmission module.

5. The many-to-many laser communication networking device of claim 2, wherein:
   the array characteristic splitting module comprises N polarization wavelength detectors, N polarization wavelength splitters, and a splitting controller; and
   each of the polarization wavelength detectors is connected to the optical fiber control unit and each of the polarization wavelength splitters respectively, each of the polarization wavelength splitters is further connected to the splitting controller and the beam switching array module respectively, and the splitting controller is further connected to the signal transmission module.

6. The many-to-many laser communication networking device of claim 5, wherein:
   the beam switching array module comprises N optical switches, N communication transceiver boards, N first optical fiber controllers, N second optical fiber controllers, and a communication controller; and each of the optical switches is connected to each of the polarization wavelength splitters and each of the first optical fiber controllers respectively, each of the optical switches is further connected to the communication controller, each of the first optical fiber controllers is further connected to each of the second optical fiber controllers and each of the communication transceiver boards, and each of the second optical fiber controllers is further connected to the optical fiber light control unit.

7. The many-to-many laser communication networking device of claim 6, wherein the signal transmission module comprises a high-speed bus connected to the optical field array control module, the divergence angle control unit, the array phase detection module, the splitting controller and the communication controller respectively.

8. The many-to-many laser communication networking device of claim 2, wherein the coupling lens unit comprises N coupling lens groups, and each of the coupling lens groups is connected to the divergence angle control unit.

9. The many-to-many laser communication networking device of claim 8, wherein:

the divergence angle control unit comprises N divergence angle adjusters and N divergence angle controllers; and each of the divergence angle adjusters is connected to each of the coupling lens groups respectively, and each of the divergence angle controllers is connected to the optical fiber light control unit.

10. The many-to-many laser communication networking device of claim 9, wherein:

the optical fiber control unit comprises N optical fibers, N third optical fiber controllers, and N optical circulators; and each of the optical fiber controllers is connected to each of the optical fibers respectively, each of the optical circulators is connected to the transceiver lens array module, and each of the optical circulators is further connected to the array characteristic splitting module.

11. The many-to-many laser communication networking device of claim 1, wherein:

the optical field array control module is further configured to adjust an incident angle between itself and the laser according to the first characteristic information; and the transceiver lens array module is further configured to adjust the angle-adjusted divergence angle of the laser according to the first characteristic information.

12. A many-to-many laser communication networking method based on the many-to-many laser communication networking device of claim 1, comprising:

receiving, by the optical field array control module, the plurality of beams of the laser with different angles sent by the plurality of satellites, and adjusting the corresponding angles of the laser before transmitting the angle-adjusted laser to the transceiver lens array module;

converting, by the transceiver lens array module, the angle-adjusted laser into the plurality of beams of the first optical fiber light and the plurality of beams of the second optical fiber light, transmitting the plurality of beams of the first optical fiber light to the array phase detection module, and transmitting the plurality of beams of the second optical fiber light to the array characteristic splitting module;

generating, by the array phase detection module, the plurality of different first characteristic information correspondingly according to the plurality of beams of the first optical fiber light, and transmitting the first characteristic information to the signal transmission module; wherein the first characteristic information is a relative angle information;

generating, by the array characteristic splitting module, the corresponding second characteristic information after analyzing the plurality of beams of the second optical fiber light, and transmitting the second characteristic information to the signal transmission module, wherein the second characteristic information is a polarization wavelength information;

transmitting, by the signal transmission module, the first characteristic information to the optical field array control module and the transceiver lens array module, and transmitting the polarization wavelength information to the beam switching array module;

adjusting, by the optical field array control module, the incident angle between itself and the laser according to the first characteristic information, and adjusting, by the transceiver lens array module, the angle-adjusted divergence angle of the laser according to the first characteristic information; and controlling, by the beam switching array module, the plurality of beams of the second optical fiber light demodulated into the baseband signals via the first path or forwarded via the second path according to the polarization wavelength information.

13. The method of claim 12, wherein the converting, by the transceiver lens array module, the angle-adjusted laser into the plurality of beams of the first optical fiber light and the plurality of beams of the second optical fiber light, transmitting the plurality of beams of the first optical fiber light to the array phase detection module, and transmitting the plurality of beams of the second optical fiber light to the array characteristic splitting module comprises:

after receiving the angle-adjusted laser transmitted by the mirror group, performing, by the coupling lens group, performing coupling to obtain the plurality of beams of the optical fiber light, and transmitting the plurality of beams of the optical fiber light to a third optical fiber controller;

after dividing the plurality of beams of the optical fiber into the plurality of beams of the first optical fiber light and the plurality of beams of the second optical fiber light, transmitting, by the third optical fiber controller, the plurality of beams of the first optical fiber to the array detector, and transmitting the plurality of beams of the second optical fiber light to an optical circulator; and transmitting, by the optical circulator, the plurality of beams of the second optical fiber light to the polarization wavelength detector.

14. The method of claim 12, wherein the adjusting, by the optical field array control module, the incident angle between itself and the laser according to the first characteristic information, and adjusting, by the transceiver lens array module, the angle-adjusted divergence angle of the laser according to the first characteristic information comprises:

after receiving the relative angle information transmitted by the high-speed bus, adjusting, by the high-precision controller, the angle of the mirror group according to the relative angle information; and after receiving the relative angle information transmitted by the high-speed bus, controlling, by the divergence angle controller, the divergence angle adjuster to adjust the angle-adjusted divergence angle of the laser according to the relative angle information.

15. The method of claim 14, wherein the controlling, by the beam switching array module, the plurality of beams of the second optical fiber light to be demodulated into the baseband signals via the first path or to be forwarded via the second path according to the polarization wavelength information comprises:

after receiving the polarization wavelength characteristic information transmitted by the high-speed bus, comparing, by the communication controller, the polarization wavelength characteristic information with a preset polarization wavelength characteristic information;

in response to that the polarization wavelength characteristic information is the same as the preset polarization wavelength characteristic information, controlling, by the communication controller, the optical switch to transmit the second optical fiber light to the communication transceiver board through the first optical fiber controller;

demodulating, by the communication transceiver board, the second optical fiber light, after obtaining the baseband signal, sending the baseband signal;

in response to that the polarization wavelength characteristic information is different from the preset polarization wavelength characteristic information, after controlling, by the communication controller, the optical switch to transmit the second optical fiber light to the second optical fiber controller through the first optical fiber controller, transmitting, by the second optical fiber controller, the second optical fiber light to the optical circulator; and after transmitting, by the optical circulator, the second optical fiber to the third optical fiber controller, transmitting, by the third optical fiber controller, the second optical fiber light to a corresponding array element, so that the array element will forward the second optical fiber light, wherein the array element comprises the mirror group, the array displacement actuator, the coupling lens group and the divergence angle adjuster.

* * * * *